US006041667A

United States Patent [19]

Pischinger et al.

[11] Patent Number: 6,041,667

[45] Date of Patent: Mar. 28, 2000

[54] METHOD OF OPERATING AN ELECTROMAGNETIC ACTUATOR WITH CONSIDERATION OF THE ARMATURE MOTION

[75] Inventors: Martin Pischinger; Thomas Esch, both of Aachen, Germany

[73] Assignee: FEV Motorentechnik GmbH & Co. KG, Germany

[21] Appl. No.: 09/124,974

[22] Filed: Jul. 30, 1998

[30] Foreign Application Priority Data

| | | | |
|---|---|---|---|
| Jul. 31, 1997 | [DE] | Germany | 197 33 141 |
| Jun. 9, 1998 | [DE] | Germany | 198 25 732 |

[51] Int. Cl.[7] .......... G01L 1/12

[52] U.S. Cl. .......... 73/862.69; 73/161

[58] Field of Search .......... 73/161, 862.69, 73/862.381

[56] References Cited

U.S. PATENT DOCUMENTS

| | | | |
|---|---|---|---|
| 4,086,809 | 5/1978 | Wu et al. | 73/161 |
| 4,749,892 | 6/1988 | Mesenich | 310/19 |
| 5,237,864 | 8/1993 | Castle et al. | 73/161 |
| 5,245,872 | 9/1993 | Cooper et al. | 73/161 |
| 5,337,110 | 8/1994 | Dowe | 396/449 |
| 5,339,515 | 8/1994 | Brackett et al. | 29/705 |
| 5,852,242 | 12/1998 | Devolk et al. | 73/514.17 |

*Primary Examiner*—Max Noori

*Attorney, Agent, or Firm*—Venable; George H. Spencer; Robert Kinberg

[57] ABSTRACT

A method of operating an electromagnetic actuator for actuating a setting member wherein the actuator includes at least one electromagnet supplied with current by a control device, and an armature that is operatively connected with the setting member to be actuated and which can be brought out of a first set position, counter to a force of a restoring spring, into a second set position, in which the armature is in contact with the pole face of the electromagnet, when the electromagnet is supplied with current. The change in the setting force of the restoring spring is detected, at least during part of the armature motion, and the respective position of the armature and/or its moving speed is or are derived from this. The derived value is used to check and/or influence the actuation of the electromagnet.

4 Claims, 3 Drawing Sheets

METHOD OF OPERATING AN ELECTROMAGNETIC ACTUATOR WITH CONSIDERATION OF THE ARMATURE MOTION

BACKGROUND OF THE INVENTION

An electromagnetic actuator for actuating a setting member has at least one electromagnet, which can be supplied with current by a control device, and an armature that is operatively connected with the setting member to be actuated and which can be brought out of a first set position, counter to the force of a restoring spring, into a second set position, in which the armature is in contact with the pole face of the electromagnet, when the electromagnet is supplied with current. If the electromagnet is set to be currentless, the armature falls back into its first set position.

The same applies for an electromagnetic actuator in which two electromagnets are disposed with spacing from one another, and between which the armature can be brought into contact with the one electromagnet in its first set position, and with the other electromagnet in its second set position, counter to a respective restoring spring, when the electromagnets are alternatingly supplied with current with the aid of a control device.

A critical factor in operating such electromagnetic actuators is that the armature be reliably brought into the set position defined by contact with the pole surface of the electromagnet, and that the armature be held securely by the electromagnet until the current to the electromagnet is switched off by the control device.

If, for example, restoring springs having a linear characteristic are used, as the armature approaches the pole surface of the electromagnet being supplied with current, a progressively-increasing magnetic force counteracts the linearly-increasing restoring force of the spring acting on the armature, so the moving speed of the armature increases as it nears the pole surface. A high impact speed of the armature at the pole surface is not only perceptible in an increased noise level, but in an extreme case, the high speed can cause the armature to "bounce" from the pole surface, which, in a favorable case, can result in multiple armature impacts until motionless contact has been achieved. In an unfavorable case, the bouncing can be so severe that the armature never achieves contact with the pole surface, but is moved back in the direction of the first set position under the influence of the restoring force. This effect can be somewhat diminished through the use of springs having a progressive characteristic, but a considerable surplus of magnetic force remains toward the end of the armature motion.

Through a corresponding control of the current supply as the armature approaches the pole surface of the electromagnet, it is possible to reduce the magnetic force proportionately to the distance from the pole surface, so the braking influence of the restoring force of the restoring spring can be better utilized and, accordingly, the armature can come to rest "gently" with reduced speed on the pole surface. Thus, not only is the noise level reduced, but at the same time the risk of bouncing is practically precluded.

To guide the current supply to the electromagnet via the control device so as to ensure reliable capture of the armature at the electromagnet, the motion of the armature must be detected and, in the same motion cycle, the magnetic force must be influenced. This is possible, for example, through the arrangement of an electrically-inductive sensor that detects the passing of the armature at a predetermined distance from the pole surface of the capturing electromagnet, so this sensor can trigger a signal that effects a reduction in the current supply to the electromagnet by a predetermined amount, and thus a reduction in the magnetic force. In this method, however, only the time at which the armature passes, but not its moving speed, can be detected. If, in addition to, for example, the force of the restoring spring counteracting the armature motion, additional forces occur in the same or opposite direction over the course of the motion, such as frictional forces from the armature guidance or stochastically-stipulated counter-forces acting on the setting member to be actuated, the flight speed of the armature can be reduced such that the armature would require the entire magnetic force to even come into contact with the pole surface of the electromagnet. If the magnetic force is reduced by a corresponding change in the current supply at the time when the armature passes the sensor, it is entirely possible that the magnetic force will not suffice even to capture the armature, so the armature will move back in the direction of its first set position.

This type of "static" detection of the armature position with a sensor is thus unsatisfactory, so attempts have been made to measure the actual armature speed with additional sensors and a time detection for obtaining a corresponding correction value to influence the current supply. It has also been proposed to derive the electrically-inductive reactions resulting from the approach of the armature to the electromagnet for correction signals, which will then be used to change the current supply, and thus change the magnetic force.

SUMMARY OF THE INVENTION

It is an object of the invention to provide a different way to solve the above described problem which offers advantages as discussed below.

The above and other objects are accomplished according to the invention by the provision of a method of operating an electromagnetic actuator for actuating a setting member, the actuator including at least one electromagnet secured to a support and which can be supplied with current by a control device, and an armature that is operatively connected with the setting member to be actuated and which can be brought out of a first set position, counter to a force of a restoring spring, into a second set position in which the armature is in contact with the pole face of the electromagnet when the electromagnet is supplied with current, the method comprising the steps of: detecting a change in the setting force of the restoring spring at least during part of the armature motion; and deriving at least one of a respective position of the armature and its moving speed from the detected change in the setting force for use in at least one of checking and influencing actuation of the electromagnet.

Thus, according to the invention the change in the setting force of the restoring spring is detected, at least during part of the armature motion, and, from this the respective position of the armature and/or its moving speed is derived in the control device for use in checking and/or influencing the actuation of the electromagnet. This solution is based on the realization that the continuously-changing position of the armature with respect to the electromagnet can be derived from a proportional change in the restoring force that is predetermined by the spring constant. A "measured value" is also given that allows conclusions to be formed about the respective position of the armature on its path from the first set position into the second set position, because the magnitude of the restoring spring in the first set position, the magnitude of the restoring spring in the second set position, that is, when the armature is in contact with the pole surface of the electromagnet, and the spring characteristic in this region are known. The magnitude of the restoring spring is exclusively dependent on the position of the armature, so additional forces occurring in the opposite direction of the armature motion need not be factored into the "measurement result" as interference variables. Thus, it is possible to trigger a setting signal, by predetermining a force that corresponds to a minimum distance between the armature and the pole surface, as soon as this force is attained during the approach of the armature to the pole surface, and correspondingly correct the current supply to the electromagnet. While the structural size of a sensor for detecting the passing of the armature as known in the prior art necessitates discrete spacing of the sensor from the pole surface, the method of the invention offers the option of providing a "measurement point" at an arbitrary distance, that is, in the immediate vicinity of the pole surface.

Instead of a "static" detection of the armature position with respect to the electromagnet, the method of the invention also offers the option of "dynamic" position detection. This can be effected, for example, in that the change in the restoring force is detected over the entire stroke and, if deviations occur from the nominal course "set" as the nominal value in the control device, setting and/or correction signals can be triggered. Moreover, it is also possible to detect the change in the restoring force in the time for deriving the moving speed of the armature. In the detection of the change in the restoring force over time, stochastic forces acting on the armature and/or the setting member to be actuated can additionally be detected, so the change in the current supply can be correspondingly adapted in the capturing phase.

An embodiment of the invention provides that the change in the setting force of the restoring spring is detected through a measurement of the compressive force on the support of the restoring spring. An advantage of this arrangement is the use of pressure sensors that are correspondingly stationary, such as piezoelectric sensors, pressing bodies provided with strain gauges or the like, so the wiring for the further conduction of the electrical measurement signals can likewise be laid in a fixed arrangement. A further advantage of this type of restoring force detection is that the detection is independent of the type of springs used, so it can be used not only with mechanical springs, such as helical compression springs, but also with other spring elements, such as pneumatic springs, rubber springs or the like.

Another embodiment of the invention provides that the change in the setting force of the restoring spring is detected through a measurement of the reaction force between the electromagnet and the support. This arrangement has the advantage that the sensor(s) need not be connected directly to the restoring spring. Normally, the electromagnet(s) is (are) disposed in a housing that is connected to the support of at least one restoring spring. In actuators having two electromagnets that are disposed with spacing from one another, as described at the outset, the housing itself also has a support for this type of restoring spring. Because the housing is assembled from numerous parts in accordance with the manufacturing technique, with the joining surfaces normally being oriented perpendicular to the force effect of the restoring spring, one or a plurality of pressure sensors can be disposed in one or more such joining surfaces. Because of the changing restoring forces acting on the support and/or the housing connecting the actuator to the support, the connection between the electromagnet and the support is acted upon by changing forces that are correspondingly proportional to the force effect of the spring, and can be detected by way of a pressure sensor disposed in the joining surface. Piezoelectric sensors or other strain gauges can also be used as sensors here.

A further embodiment of the invention provides that the change in the restoring force, particularly in a mechanical spring, is detected through a measurement of the deformation of the spring itself. In helical compression springs, this can be effected, for example, through an arrangement of strain gauges in the form of a Wheatstone bridge circuit directly on the spring bodies.

BRIEF DESCRIPTION OF THE DRAWINGS

The method of the invention is described in detail in conjunction with embodiments of electromagnetic actuators shown in schematic drawings.

DETAILED DESCRIPTION OF THE INVENTION

Figure 1:
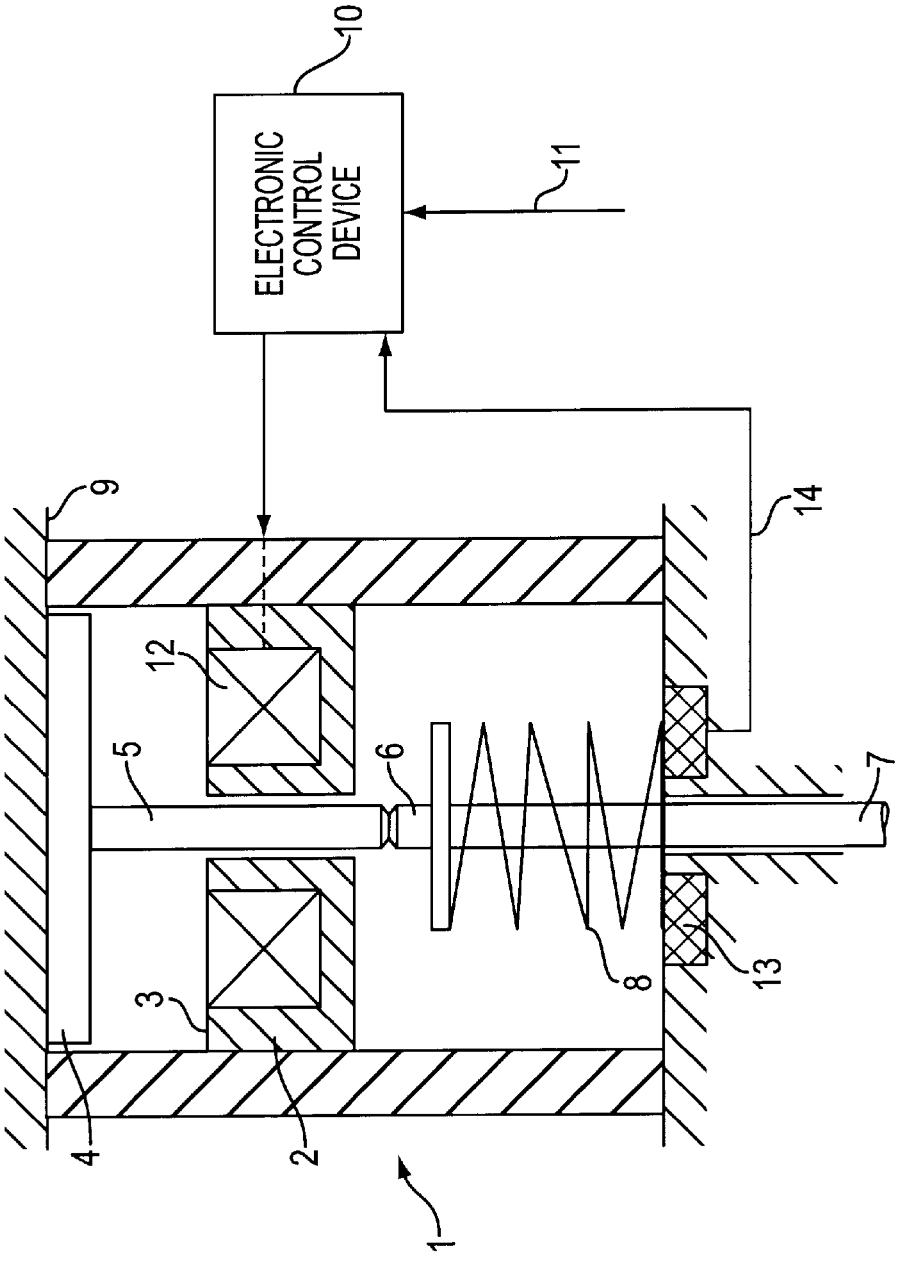
FIG. 1 is a schematic cross section which shows a simple actuator having only one restoring spring which can be used to implement the method of the invention.

FIG. 1 is a schematic cross section which shows an electromagnetic actuator 1 including an electromagnet 2 with a pole surface 3 and an associated armature 4. Armature 4 is supported by a guide rod 5 on a free end 6 of a setting member 7 that is to be actuated. A restoring spring 8 holds armature 4 against a stop 9 in a first set position with spacing from pole surface 3 of electromagnet 2.

Electromagnet 2 is connected to an electronic control device 10 by which a coil 12 of the electromagnet is supplied with current corresponding to supplied control signals 11.

When the current is switched on, a magnetic field is built up, through which armature 4 is moved in the direction of pole surface 3 of electromagnet 2, counter to the restoring force of restoring spring 8. The armature comes into contact with the pole surface in its second set position and, for the duration of the current supply, is held in this second set position. Restoring spring 8 is compressed corresponding to the setting stroke.

If control device 10 sets electromagnet 2 to be currentless, armature 4 is guided back into its first set position at stop 9 under the influence of the restoring force of restoring spring 8.

In the electromagnetic actuator 1 shown here, restoring spring 8 is supported on a force-sensing sensor 13. It is therefore possible to detect the restoring force of restoring spring 8, which changes as the armature moves. Force-sensing sensor 13 can be constructed, for example, on a piezoelectric base, so an electrical signal 14 is available, which can be supplied to control device 10 and correspondingly processed. Because the restoring force in the first switching position, the restoring force in the second switching position and the stroke of the system predetermined by the distance between the two switching positions and the spring characteristic are known, the respective armature positions can be derived from the force measurement during the armature motion. From this, the respective corresponding setting signals can be derived, for example through predetermining a threshold value for the restoring spring, corresponding to the respective requirements. A corresponding setting signal is triggered when this threshold value is attained.

Because time-related signals can also be inputted via input signal 11, and, furthermore, control device 10 can be equipped with a corresponding time meter, it is also possible to determine the change in the restoring force per unit of time, so the moving speed of armature 4 can be derived, the speed being dependent not only on the mass to be moved and the magnitude of the restoring spring, but also on other external influences, for example frictional resistances or the like. Hence, such influences can also be corrected.

In the selection and arrangement of sensor 13, only shown schematically here, it must be taken into account that the working line of the resulting force of a perpendicularly-loaded helical compression spring is generally not congruent with the geometrical center axis of the spring. The cause of this is the type of force introduction stipulated by the helical line, which does not permit a uniform loading of the spring ends over the circumference. Consequently, the force is introduced at preferred locations on the contact surface, typically with two to three distinct pressure centers. The resulting summation point of the individual forces can be determined from the pressure distribution, and taken into consideration in the signal generation and evaluation. The eccentric position of this point effects reaction forces in the contact surface of the spring, which can be detected in transverse forces and restraining moments. Problems of this nature are to be anticipated anywhere movable parts are supported by helical compression springs and the functioning reliability is impaired by friction and wear due to the aforementioned reaction forces. In the present method, these moments are transmitted to the armature, and effect a rotation of the armature about its vertical axis. A consequence of this is the undesired impact of the armature against the spacing blocks limiting the armature space laterally, and the associated risk of wear and the introduction of stochastic frictional effects into the spring-mass system, which is capable of oscillating. This form of armature motion is undesirable, and should therefore be kept to a minimum.

Figure 2:
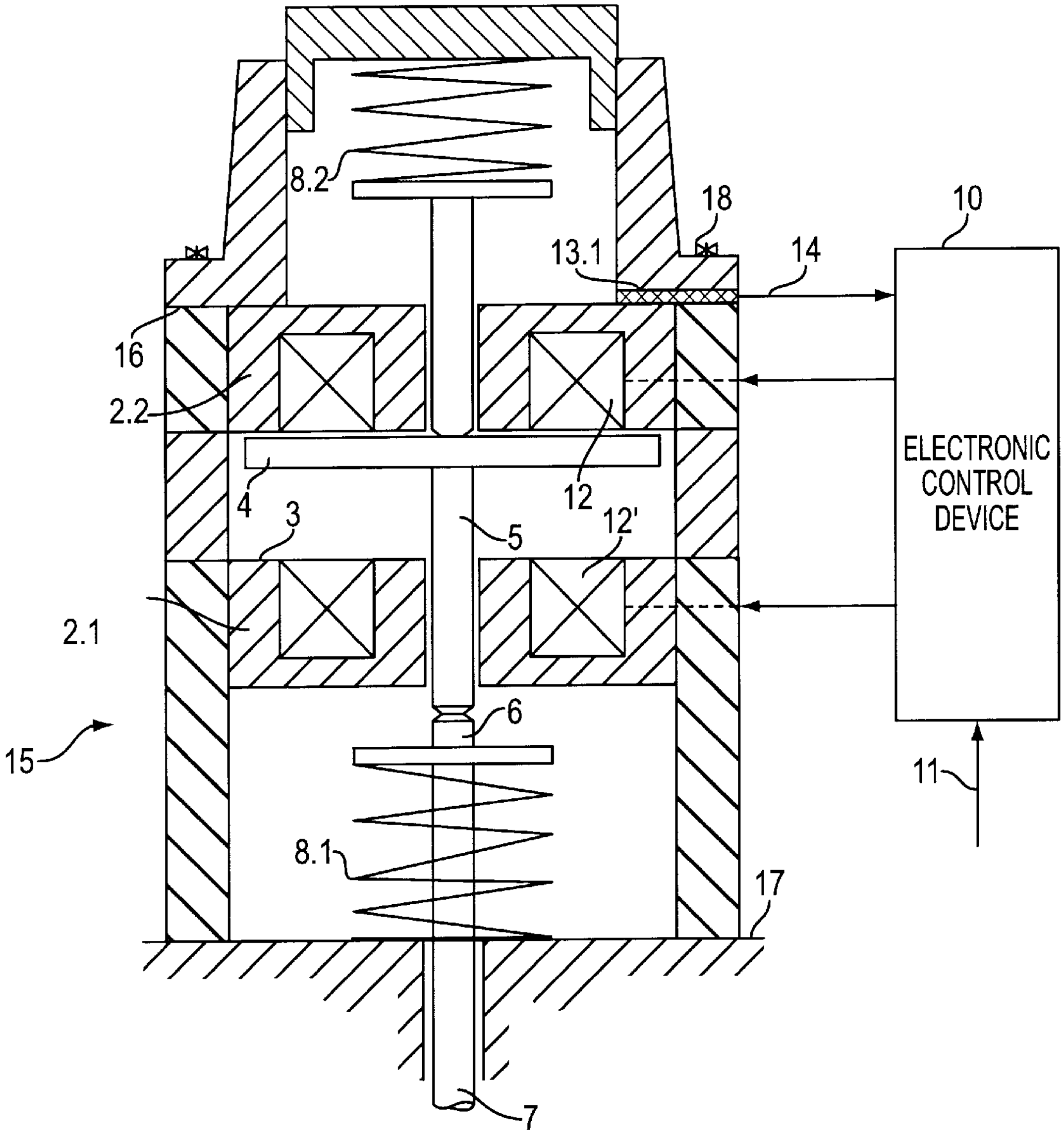
FIG. 2 is a schematic cross section which shows an actuator for actuating a cylinder valve having two electromagnets which can be used to implement the method of the invention.

FIG. 2 illustrates the use of the method for an electromagnetic actuator in which two electromagnets 2.1 and 2.2 are disposed with spacing from one another, and between which armature 4 can move back and forth, counter to the force of respective restoring springs 8.1 and 8.2. The arrangement here is practically a mirror image of the system shown in FIG. 1, with the first set position being defined by the contact of armature 4 with electromagnet 2.1 and the second set position being defined by the contact of armature 4 with electromagnet 2.2. The two electromagnets 2.1 and 2.2 are disposed in a multi-part housing 15, having individual housing parts that are clamped to one another and to a base 17, for example a cylinder head. Joining surfaces 16 are oriented transversely to the force direction of restoring springs 8. The force directions of restoring springs 8.1 and 8.2 are oriented opposite one another, so that when the electromagnets are set to be currentless, armature 4 comes to rest in a central position between the two electromagnets 2, assuming identical springs. Restoring spring 8.1 serves as a closing spring, while restoring spring 8.2 serves as an opening spring. The two electromagnets 2 are alternatingly supplied with current by a corresponding control device 10 in accordance with the predetermined control program, so armature 4 and thus setting member 7, for example a cylinder valve in a reciprocating engine, can be moved back and forth. In accordance with the control program, holding times can also be provided, so armature 4 can be held in one or the other setting position for predeterminable times corresponding to the presetting by the control device.

Instead of detecting the change in the force effect of the restoring springs, which occurs as the armature moves, directly via the support of one of the restoring springs, as in FIG. 1, in the embodiment according to FIG. 2, a corresponding pressure sensor 13.1 is disposed in at least one of the joining surfaces 16 between the individual housing parts. The pressure sensor detects the changing force effects on the connecting elements 18, only indicated here, which become effective when the armature moves due to the changing setting forces of restoring springs 8. In this case as well, signal 14 originating from sensor 13.1 is supplied to control device 10.

In this actuator having two restoring springs that face one another, the above-described problem of armature rotation, as well as its effects on the sensor detection and the effect of the unavoidable eccentric force introduction, is taken into account in the design of the helical springs of the electromagnetic actuator. The effects of the moments acting on armature 4 due to closing spring 8.2 and closing spring 8.1 are intended to cancel each other out, so armature 4 does not rotate. This is made possible by different winding directions of the opening and closing springs. In this winding arrangement, the spring forces introduced via the end windings cause the two springs to rotate in opposite directions in operation. These opposite-direction spring rotations are therefore not transmitted to the armature, and do not cause the armature to rotate when equal spring transverse-force components are introduced.

Figure 3:
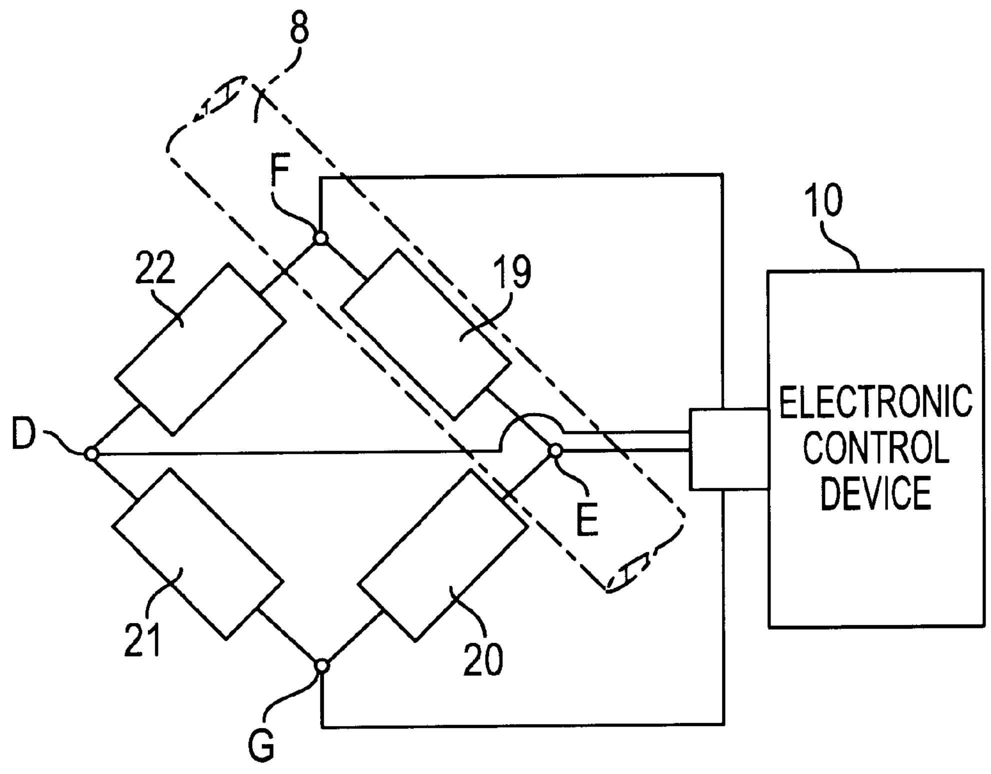
FIG. 3 is a block circuit diagram illustrating a further embodiment of the method according to the invention.

Referring to FIG. 3, there is shown a diagram of a circuit for using strain gauges and their connection to electronic control device 10. FIG. 3 shows that a strain gauge 19, which is arranged on a deforming region of spring 8, is connected in a standard way in a Wheatstone full bridge circuit with three additional strain gauges 20, 21, 22. The two corner points D and E of the bridge circuit provide outputs to electronic control device 10, whereas the two corner points F and G are connected to a voltage supply for electronic control device 10.

The circuit is adjusted so that if the actuator is not moving, an output signal is generated that must be evaluated as "zero." If the armature is put in motion, then spring 8 experiences a deformation, which leads to corresponding changes in length on the spring surface to which the strain gauge 19 is glued. Strain gauge 19 is also deformed as a result of this change in length, so that its forward resistance changes and the measuring bridge is correspondingly "detuned." Owing to the changes in the spring expansion and associated changes in the expansion of strain gauge 19, and the changed resistance between F, D, G on the one hand, and F, E, G on the other hand, different voltages are present between points D and E so that a current flows that is proportional to the changes in the forward resistance of strain gauge 19, caused by the deformation. The intensity of the current is available as a signal proportional to the spring deformation for evaluation in electronic control device 10.

The invention has been described in detail with respect to preferred embodiments, and it will now be apparent from the foregoing to those skilled in the art, the changes and modifications may be made without departing from the invention in its broader aspects, and the invention, therefore, as defined in the appended claims, is intended to cover all such changes and modifications as to fall within the true spirit of the invention.

What is claimed is:

1. A method of operating an electromagnetic actuator for actuating a setting member, the actuator including at least one electromagnet secured to a support and which is supplied with current by a control device, said electromagnet having a pole face, and an armature that is operatively connected with the setting member to be actuated and which is brought out of a first set position, counter to a force of a restoring spring, into a second set position in which the armature is in contact with the pole face of the electromagnet when the electromagnet is supplied with current, the method comprising the steps of:

detecting a change in the setting force of the restoring spring at least during part of the armature motion; and deriving at least one of a respective position of the armature and its moving speed from the detected change in the setting force for use in at least one of checking and influencing actuation of the electromagnet.

2. The method as defined in claim 1, wherein the detecting step includes detecting the change in the setting force of the restoring spring by measuring a compressive force on the support of the restoring spring.

3. The method as defined in claim 1, wherein detecting step includes detecting the change in the setting force of the restoring spring by measuring a reaction force between the electromagnet and the support.

4. The method as defined in claim 1, wherein the detecting step includes detecting a change in the setting force by measuring a deformation of the restoring spring.

* * * * *